(12) United States Patent
Asher

(10) Patent No.: US 7,059,719 B2
(45) Date of Patent: Jun. 13, 2006

(54) CONTACT LENSES COLORED WITH CRYSTALLINE COLLOIDAL ARRAY TECHNOLOGY

(75) Inventor: Sanford Asher, Pittsburgh, PA (US)

(73) Assignee: University of Pittsburagh - of the Commonwealth System of Higher Education, Pittsburgh, PA (US)

( * ) Notice: Subject to any disclaimer, the term of this patent is extended or adjusted under 35 U.S.C. 154(b) by 0 days.

(21) Appl. No.: 10/929,615

(22) Filed: Aug. 30, 2004

(65) Prior Publication Data

US 2005/0094094 A1    May 5, 2005

Related U.S. Application Data

(60) Provisional application No. 60/499,560, filed on Sep. 2, 2003.

(51) Int. Cl.
*G02C 7/04* (2006.01)

(52) U.S. Cl. .................................. 351/162; 351/177

(58) Field of Classification Search ................ 351/162, 351/160 R, 160 H, 161
See application file for complete search history.

(56) References Cited

U.S. PATENT DOCUMENTS

| | | | |
|---|---|---|---|
| 4,447,474 A | | 5/1984 | Neefe |
| 4,701,038 A | * | 10/1987 | Neefe .......................... 351/162 |
| 4,719,657 A | | 1/1988 | Bawa |
| 5,414,477 A | | 5/1995 | Jahnke |
| 5,574,517 A | | 11/1996 | Pang et al. |
| 6,123,845 A | | 9/2000 | Asher et al. |
| 6,139,147 A | * | 10/2000 | Zhang .......................... 351/161 |
| 6,164,777 A | | 12/2000 | Li et al. |
| 2001/0004279 A1 | * | 6/2001 | Sako et al. .................. 349/158 |
| 2001/0026946 A1 | * | 10/2001 | Asher .......................... 436/531 |
| 2003/0027240 A1 | * | 2/2003 | Asher et al. ................... 435/25 |
| 2004/0018160 A1 | * | 1/2004 | Hu et al. ....................... 424/63 |
| 2004/0114101 A1 | * | 6/2004 | Thakrar ....................... 351/162 |

* cited by examiner

*Primary Examiner*—Jordan M. Schwartz
(74) *Attorney, Agent, or Firm*—Arnold B. Silverman; Eckert Seamans Cherin & Mellott, LLC

(57) ABSTRACT

A colored contact lens whose color is produced by Bragg diffraction incorporates a crystalline colloidal ordered array of particles to impart vivid sparkling color to the whole lens or a portion of the lens. In some embodiments, for example, only portions of the lens that would be located on the iris of the eye may be colored.

11 Claims, No Drawings

CONTACT LENSES COLORED WITH CRYSTALLINE COLLOIDAL ARRAY TECHNOLOGY

CROSS-REFERENCE TO RELATED APPLICATIONS

This application claims priority to provisional application Ser. No. 60/499,560, filed Sep. 2, 2003.

FIELD OF THE INVENTION

This invention relates to colored contact lenses, that obtain their color through Bragg diffraction. More specifically, the contact lenses obtain their color through the diffraction properties of crystalline colloidal ordered arrays.

BACKGROUND INFORMATION

Contact lenses have been available in many colors, for many years, in both hard, including rigid gas permeable (RGP), and soft contact lenses. Both solid-colored lenses and tinted-colored lenses have been disclosed. Such lenses may be colored by adding the colorants to the monomers used to make the lens, while the monomers are in the liquid state and before polymerization of the monomers to form the colored lens material. Solid-colored lenses typically employ pigments to color the portion of the lens covering the iris and the color masks the underlying iris pattern while the lens is worn. Of course, with such solid-colored lenses, a transparent area is left over the optical zone so the contact-lens wearer can see.

Tinted contact lenses employ dyes to provide color without completely blocking the passage of light through the lens. For example, U.S. Pat. No. 4,447,474 to Neefe discloses a method of tinting specific areas of soft contact lenses by placing the dye in a dye carrier made of a porous material of the size and shape of the area to be tinted. The soft lens is placed on the dye carrier and absorbs the dye in a predetermined pattern. The acid dyes known as azo dyes may be used to practice the invention, as may the dyes known as reactive dyes and sulfur dyes. The sulfur dyes are fixed or made fast by removing the sodium sulfide that make the dye soluble. Reactive dyes require no special fixing step, only extraction of unreacted dye, as they react chemically with the lens material and are thus made permanent. The properties of dyes are well known in the art. Water-soluble dyes for tinting have been selected on the basis of their water solubility, previous FDA approval for human use, and their commercial availability as biological dyes. Care must be taken that the water-soluble dyes do not leach from the lens and stain the ocular tissue, especially during long-term contact with the eye.

A disadvantage of tinted lenses is that, although they are capable of enhancing existing eye color or changing the color of light-colored eyes, tinted lenses are not generally able to produce a fundamental color change, for example, from dark brown to light blue. Especially with darker eyes (producing a dark background to the contact lens), it is difficult to see a color change with tinted lenses. On the other hand, although opaque lenses are generally capable of causing a fundamental color change, the result tends to be an unnatural appearance unless a pattern in the opaque colorant is very artistically drawn. Moreover, a thick opaque colorant on a lens may reduce the amount of oxygen transmitted through the lens, which may be unhealthy for the cornea.

To increase the natural appearance of a colored lens, iris-patterns have been made. See, for example, U.S. Pat. No. 4,719,657 to Bawa and U.S. Pat. No. 5,414,477 to Jahnke. Iris-pattern lenses can be made in various ways. For example, it is known to laminate a painted or printed iris pattern inside the lens material. A designed intermittent pattern can be generated by offset pad printing. However, current printing technology has limitations in the printing of smaller dots. They are normally in the range of at least 20 to 100 .mu.m, which may adversely affect the comfort of the lens.

Another problem with solid or tinted lenses relates to the fact that soft contact lenses in contrast to hard or RGP lenses, are most commonly fitted with a diameter larger than that of the cornea. Thus, in order for the lens to be unnoticeable and remain natural in appearance, complicated and expensive fabrication steps such as masking are generally necessary to produce a configuration involving a colored iris and a concentric outer area that is not colored, so that the colored portion will not cover the sclera of the eye. An objectionable cosmetic effect for the wearer would occur if the margin of a tinted lens were conspicuous against the white sclera of the eye. Similarly, colorants must not bleed or leach from one area of the lens to another, nor must they leach into the tear fluid and thereby ultimately into the eye.

U.S. Pat. No. 5,574,517 to Pang et al. discloses the use of interference coating in a visual aid for individuals with red-green color blindness or color deficiency. The subject visual aid comprises a pair of optical elements, such as the lenses of a pair of eyeglasses, each element having an interference coating applied to one surface thereof. The stack is structured to give the optical elements a pre-selected spectral transmission curve with respect to eyeglasses. It also provides a multi-colored aesthetically pleasing reflective surface when viewed from the front. Pang et al. state that the optical elements may be corrective glass or plastic lenses mounted in a pair of spectacle frames, for example, ordinary glasses. Pang et al. mention that, alternately, such optical elements may take the form of contact lenses worn directly on the eye, subject to applicable health and safety requirements. Pang et al., however, disclose no embodiment for such a contact lens. Pang et al. also report that contact lenses previously sold as visual aids for color-deficient individuals, to be worn on their non-dominant eye, including the "X-Chrom" lens, did not achieved wide acceptance. Pang et al. state that the filters used in such lenses reportedly tended to reduce the number of colors that could be perceived and reduced the overall amount of light entering the eye, making them unacceptable for use in low lighting conditions, among other problems.

U.S. Pat. No. 6,164,777 to Li et al. discloses colored contact lenses that are colored by means of interference coatings for cosmetically enhancing or changing the color of the eyes. In particular, the interference coating is applied to a surface of the lens material and, although transparent to the cornea and iris anatomy, so that the coating reflects preselected bands of the light spectrum to cosmetically change or enhance the natural color or hue of the eye.

DETAILED DESCRIPTION OF PREFERRED EMBODIMENTS

The disclosures of U.S. Pat. No. 6,123,845 are expressly incorporated herein by reference.

The present invention relates to colored contact lenses that obtain their color through Bragg diffraction. Generally, the present invention relates to contact lenses that utilize the diffraction properties of crystalline colloidal ordered arrays. More specifically, the present invention relates to contact lenses comprising a hydrogel with a light diffracting crystalline colloidal ordered array of particles polymerized in said hydrogel. The colloidal array possesses a lattice spacing that establishes the diffracted wavelength of the array. If the spacing remains constant during wear, the diffracted wavelength does not change and the observed color is constant. If the spacing during wear changes in response to some stimuli, such as a chemical stimulus, the diffracted wavelength changes so that the observed color changes. In either case, the observed colorations are vibrant and sparkling, not only capable of enhancing the hue of a person's iris, but also capable of satisfactorily changing the color of the eyes of the wearer. A lens may be used solely for the cosmetic effects of color change or also to improve vision. As no dyes are involved, the lens cannot impart a coloration to the surface of the eye by the leaching of dye from the lens.

Whereas particular embodiments of this invention have been described above for purposes of illustration, it will be evident to those skilled in the art that numerous variations of the details of the present invention may be made without departing from the invention as defined in the appended claims.

What is claimed is:

1. A colored contact lens composed of a material which has a light-diffracting crystalline colloidal-ordered array of particles polymerized in a hydrogel such that when the lattice spacing is fixed, the diffracted wavelength of the array does not change and the lens color does not change and when the lattice spacing changes, the diffractive wavelength of the array changes and the color changes, said color being produced by Bragg diffraction, and said color being present substantially soley adjacent to the iris of the eye of the user.

2. A colored contact lens of claim 1 comprising:
    said crystalline colloidal ordered array having a fixed lattice spacing when a stimulus is not provided to said lens.

3. A colored contact lens of claim 1 comprising:
    a hydrogel that undergoes a volume change in response to a chemical stimulus; and
    said crystalline colloidal ordered array having a lattice spacing that changes when said volume of said hydrogel changes.

4. A colored contact lens of claim 1 including said lens having vivid, sparkling color on at least a portion thereof.

5. The colored contact lens of claim 4 including said contact lens being a cosmetic lens.

6. A method of creating a colored contact lens comprising providing a material which has a light-diffracting crystalline colloidal-ordered array of particles polymerized in a hydrogel such that when the lattice spacing is fixed, the diffracted wavelength of the array does not change and the lens color does not change and when the lattice spacing changes, the diffractive wavelength of the array changes and the color changes, said color being produced by Bragg diffraction, and establishing said color substantially soley adjacent to the iris of the eye of the user.

7. A method of coloring all or parts of a contact lens of claim 6 comprising:
    maintaining said crystalline colloidal array with a fixed lattice spacing when a stimulus is not provided to said lens.

8. A method of coloring all or parts of a contact lens of claim 6 comprising:
    effecting a change in said lattice spacing in said crystalline colloidal array when said volume of said hydrogel changes.

9. A method of coloring all or parts of a contact lens of claim 8 comprising:
    effecting said volume change of said hydrogel in response to a chemical stimulus.

10. A method of coloring a contact lens of claim 6 including establishing in said lens a vivid, sparkling color on at least a portion thereof.

11. The method of coloring a contact lens of claim 10 including employing said method to make a contact lens.

* * * * *

UNITED STATES PATENT AND TRADEMARK OFFICE
CERTIFICATE OF CORRECTION

PATENT NO. : 7,059,719 B2
APPLICATION NO. : 10/929615
DATED : June 13, 2006
INVENTOR(S) : Sanford Asher and Gerald G. Cano It is certified that error appears in the above-identified patent and that said Letters Patent is hereby corrected as shown below:

On Title page (item 75)
Inventors: Sanford Asher and Gerald G. Cano. Add --Gerald C. Cano--.

Column 3, line 31, change the word "diffractive" to --diffracted--.

Column 3, line 34, the word "soley" is spelled incorrectly and should be changed to --soley--.

Column 4, line 18, the word "soley" is spelled incorrectly and should be changed to --solely--.

Signed and Sealed this

Fifth day of September, 2006

JON W. DUDAS
*Director of the United States Patent and Trademark Office*